US011987051B2

(12) United States Patent
Takamura

(10) Patent No.: US 11,987,051 B2
(45) Date of Patent: May 21, 2024

(54) LIQUID DISCHARGE HEAD AND LIQUID DISCHARGE DEVICE

(71) Applicant: TOSHIBA TEC KABUSHIKI KAISHA, Tokyo (JP)

(72) Inventor: Jun Takamura, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 18 days.

(21) Appl. No.: 17/745,552

(22) Filed: May 16, 2022

(65) Prior Publication Data

US 2023/0032990 A1 Feb. 2, 2023

(30) Foreign Application Priority Data

Jul. 27, 2021 (JP) ................................ 2021-122701

(51) Int. Cl.
*B41J 2/14* (2006.01)

(52) U.S. Cl.
CPC ................................ *B41J 2/14201* (2013.01)

(58) Field of Classification Search
CPC . B41J 2/14201; B41J 2202/11; B41J 2/14209
See application file for complete search history.

(56) References Cited

U.S. PATENT DOCUMENTS 7,922,305 B2 4/2011 Iriguchi
10,406,814 B2 9/2019 Suzuki
11,254,132 B2 2/2022 Hirata
2020/0198352 A1 6/2020 Kato

FOREIGN PATENT DOCUMENTS

EP 3372408 A1 9/2018
EP 3827991 A1 * 6/2021 .......... B41J 2/14201
EP 3827991 A1 6/2021
JP H08174819 A 7/1996
JP 2001088295 A 4/2001
JP 2013169746 A 9/2013

OTHER PUBLICATIONS

Extended European Search Report dated Nov. 7, 2022, mailed in counterpart European Application No. 22178608.0, 8 pages.

* cited by examiner

*Primary Examiner* — Lisa Solomon
(74) *Attorney, Agent, or Firm* — Kim & Stewart LLP

(57) ABSTRACT

According to one embodiment, a liquid discharge head includes a pressure chamber and a nozzle. The pressure chamber extends in a first direction from a first end to a second end and forms a flow path for a fluid to be ejected from the nozzle. The nozzle is for ejecting liquid from the pressure chamber in a second direction intersecting the first direction. The nozzle is at a position offset from a midpoint of the pressure chamber in the first direction towards one of the first or second ends of the pressure chamber.

15 Claims, 11 Drawing Sheets

LIQUID DISCHARGE HEAD AND LIQUID DISCHARGE DEVICE

CROSS-REFERENCE TO RELATED APPLICATION

This application is based upon and claims the benefit of priority from Japanese Patent Application No. 2021-122701, filed Jul. 27, 2021, the entire contents of which are incorporated herein by reference.

FIELD

Embodiments described herein relate generally to a liquid discharge head and a liquid discharge device.

BACKGROUND

A liquid ejection head, such as an inkjet head, may be of a so called "side shooter" type or an "end shooter" type. In an inkjet head of either type, bubbles may become entrained from an ejection nozzle or bubble nuclei generated in ink (or other liquid) near the nozzle may grow in size due to pressure changes during liquid discharging. The presence of such bubbles may hinder the liquid discharge operation. If a bubble is in the pressure chamber, the pressure required for performing a discharge can be absorbed (dissipated) by the bubble so that the pressure increase necessary for performing a discharge might not be obtained, which may cause a non-discharge event (discharge failure). In an end shooter type inkjet head, the bubble tends to move towards an ink inflow side due to negative pressure during non-operation (non-ejection) times. On the other hand, in a side shooter type inkjet head, if bubble entrainment occurs in from the nozzle or is otherwise generated near the nozzle, it is difficult for the bubble to escape therefrom so that it is difficult to recover from a non-discharge event.

DETAILED DESCRIPTION

Certain embodiments provide a liquid discharge head and/or a liquid discharge device for which entrained or generated bubbles can be removed from a pressure chamber used for discharging/ejecting liquid through a nozzle.

In general, according to one embodiment, a liquid discharge head includes a pressure chamber extending in a first direction from a first end to a second end as a flow path for a fluid and a nozzle for ejecting liquid from the pressure chamber in a second direction intersecting the first direction. The nozzle is at a position offset from a midpoint of the pressure chamber in the first direction towards one of the first or second ends of the pressure chamber.

First Embodiment

Figure 1:
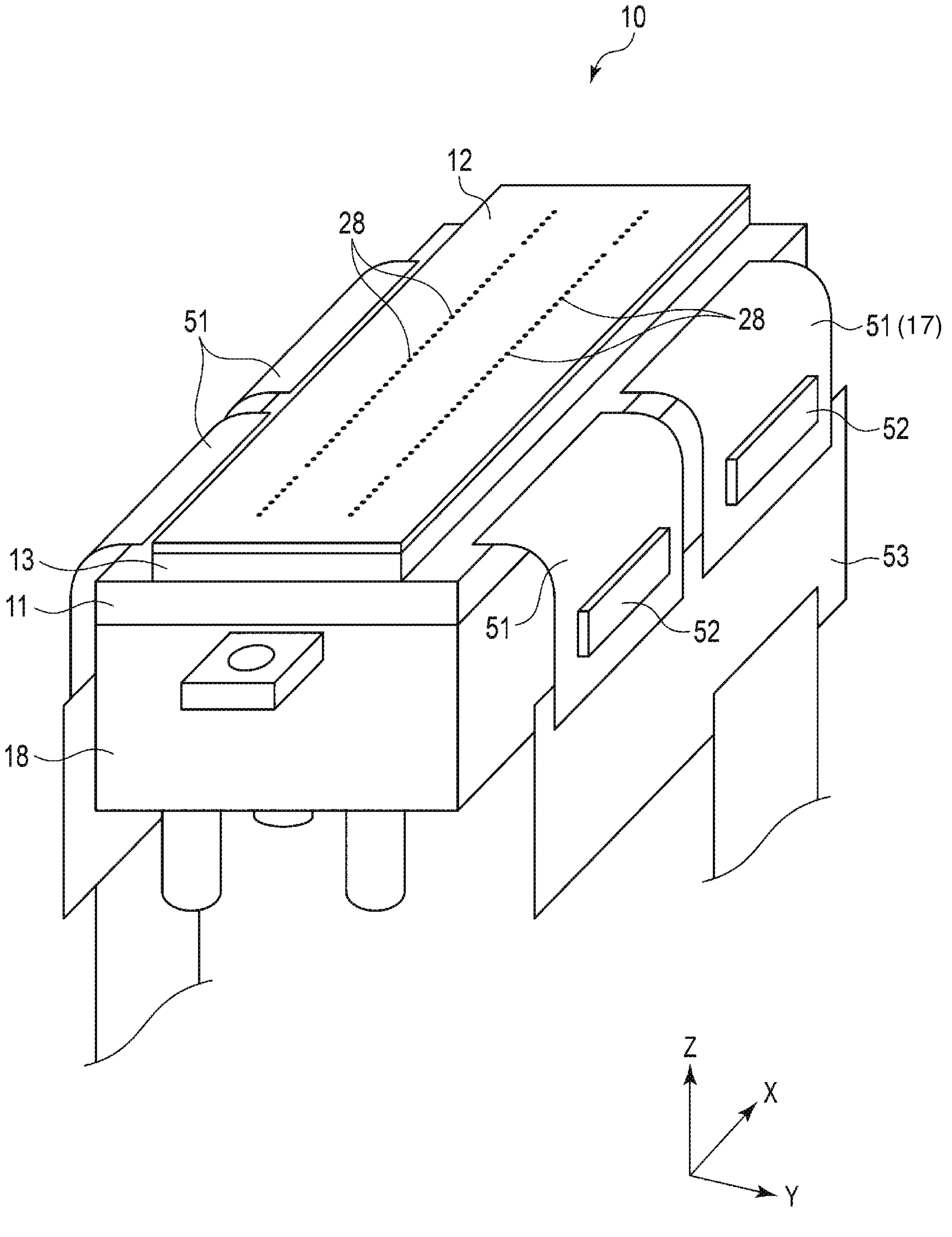
FIG. 1 depicts an inkjet head in a perspective view according to a first embodiment.
Figure 2:
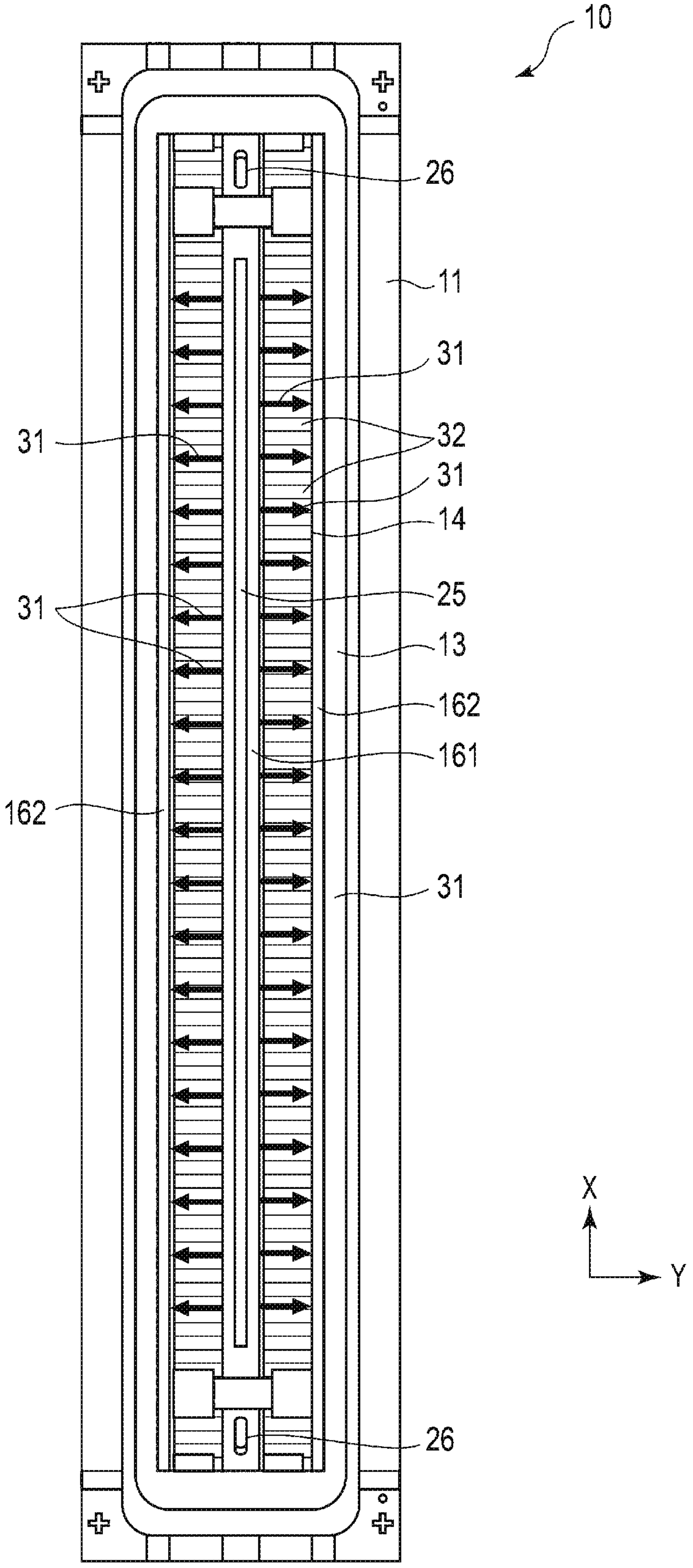
FIG. 2 depicts a partial configuration of an inkjet head in a plan view according to a first embodiment.
Figure 3:
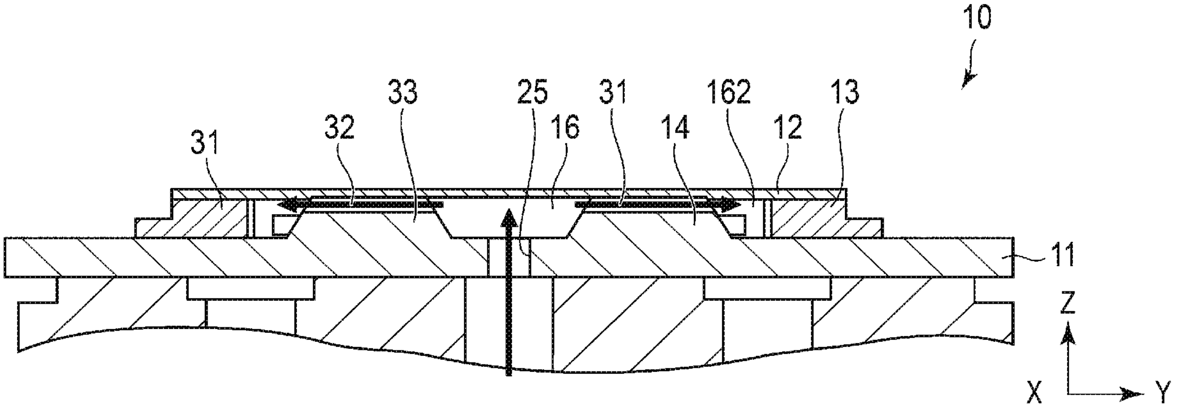
FIG. 3 depicts a partial configuration of an inkjet head in a cross-sectional view according to a first embodiment.
Figure 4:
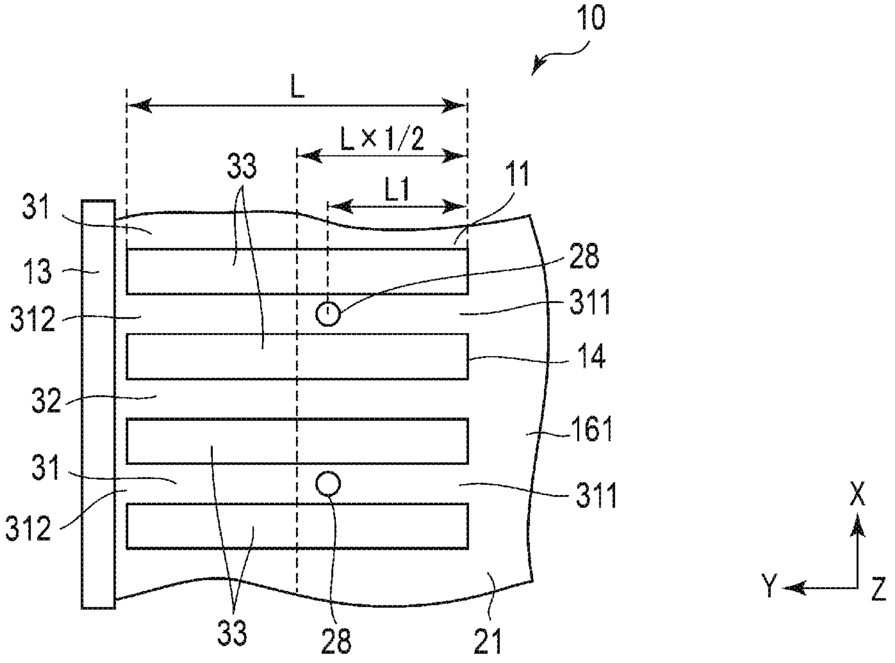
FIG. 4 depicts a partial configuration of an inkjet head in a plan view according to a first embodiment.
Figure 5:
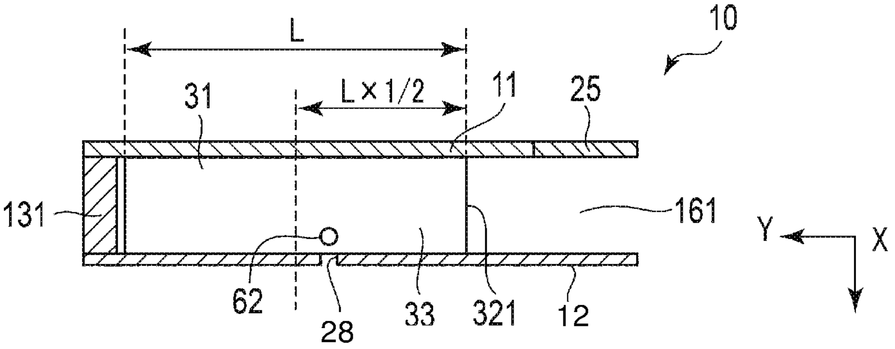
FIG. 5 depicts a partial configuration of an inkjet head in a cross-sectional view according to a first embodiment.
Figure 6:
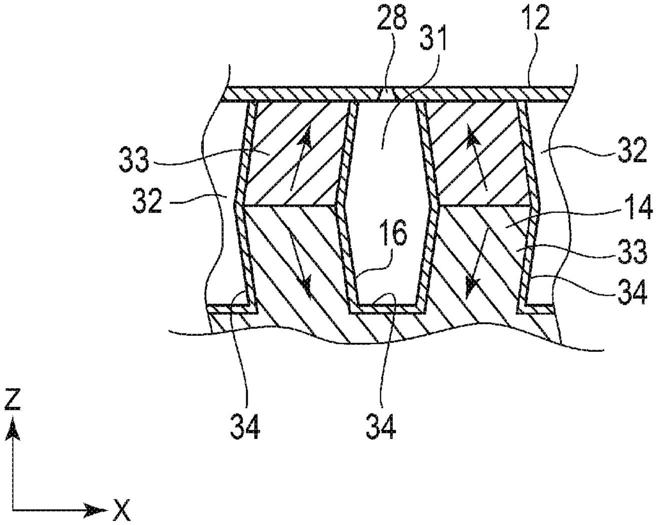
FIG. 6 is an explanatory diagram of an operation example of an inkjet head according to a first embodiment.
Figure 7:
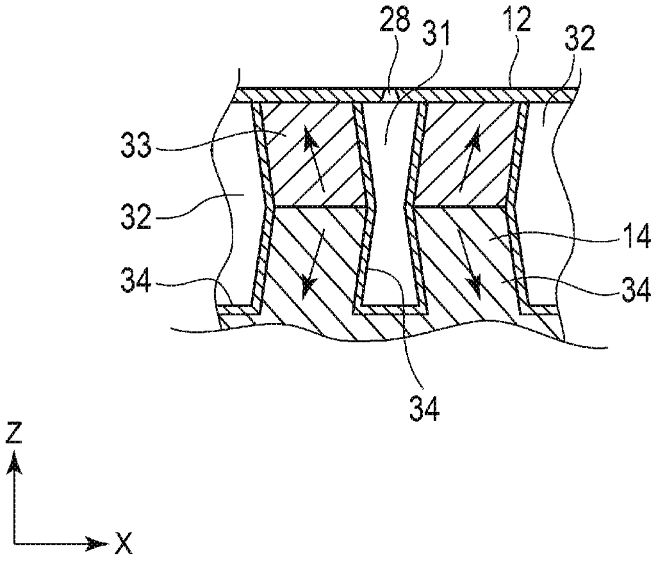
FIG. 7 is an explanatory diagram of an operation example of an inkjet head according to a first embodiment.
Figure 8:
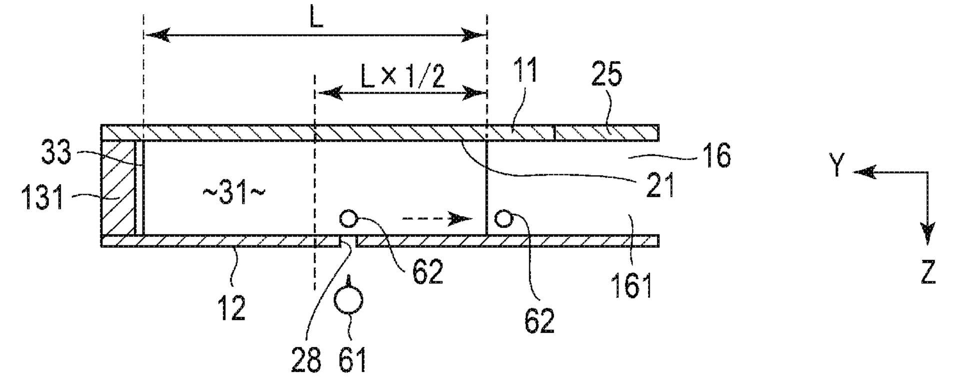
FIG. 8 is an explanatory diagram of a behavior of a bubble in an inkjet head according to a first embodiment.

An inkjet head 10 as one example of a liquid ejection head according to a first embodiment will be described with reference to FIGS. 1 to 8. FIGS. 1 to 3 are schematic views showing a configuration of an inkjet head. FIG. 1 is a perspective view. FIG. 2 is a plan view. and FIG. 3 is a cross-sectional view. FIGS. 4 and 5 schematically show a part of the inkjet head. FIG. 4 is a plan view, and FIG. 5 is a cross-sectional view. FIGS. 6 and 7 are views related to an explanation of the operation of an inkjet head, and FIG. 8 is an explanatory view showing a behavior of a bubble.

The inkjet head 10 is, for example, a side shooter type inkjet head with a shear-mode shared wall design. The inkjet head 10 is a device configured to eject ink (one example of a fluid or liquid) and is, for example, installed in an inkjet printer. The inkjet head 10 of the first embodiment is, for example, of a non-circulation type.

The inkjet head 10 includes a base plate 11, a nozzle plate 12, and a frame member 13. The base plate 11 is an example of a base member. The inkjet head 10 also includes a common chamber 16 (see FIG. 3, for example) to which ink is supplied. The common chamber 16 communicates with either or both ends of each of the pressure chambers 31. In the first embodiment, as one example, a supply chamber 161 and a discharge (ejection) chamber 162 each serving as or constituting part of the common chamber 16 are provided to an ink supply side and an ink discharge side, respectively.

Components such as a circuit board for controlling the inkjet head 10 and a manifold 18 that forms a part of a path between the inkjet head 10 and an ink tank may be incorporated together or integrated with each other in a device or apparatus. The inkjet head 10 may itself include such components or other components as appropriate.

As shown in FIG. 1, the base plate 11 is formed in a rectangular plate shape of a ceramic material, such as alumina or the like. The base plate 11 includes a flat mounting surface 21 (see FIG. 8). As shown in FIG. 2, the mounting surface 21 includes a plurality of supply holes 25, a plurality of discharge holes 26, and a pair of actuators 14.

The plurality of supply holes 25 are provided to the base plate 11 next to each other in a row running in the same direction as the arrangement direction (X-axis) of the ejection nozzles 28 of the nozzle plate 12. Each supply hole 25 connects to an ink supply section of the manifold 18. Each supply hole 25 is connected to the ink tank via the ink supply section. Ink in the ink tank is supplied to the common chamber 16 from the supply holes 25. For example, the ink flows from the ink tank into the common chamber 16 through the supply holes 25. The ink is then supplied to the plurality of pressure chambers 31 from the common chamber 16 and ejected from the respective ejection nozzles 28. The pressure chambers 31 are provided in each of the actuators 14.

The discharge holes 26 are in the base plate 11 at end portions of the actuator opposite from the ends at which the pressure chambers are disposed. The discharge holes 26 are positioned such that a secondary side can be released/opened during maintenance.

The pair of actuators 14 are bonded to the mounting surface 21 of the base plate 11. Each of the actuators 14 are formed using two plate-shaped piezoelectric bodies. The two piezoelectric bodies are bonded to each other so that polarization directions thereof are opposite to each other in a thickness direction. The piezoelectric body is formed of, for example, lead zirconate titanate (PZT). Each actuator 14 is bonded to the mounting surface 21 by, for example, a thermosetting epoxy adhesive.

The actuator 14 has a trapezoidal shape in cross section. A top portion of the actuator 14 is bonded to the nozzle plate 12. The plurality of pressure chambers 31 as well as a plurality of dummy chambers 32 are provided in the actuator 14. Both the pressure chambers 31 and the dummy chambers 32 are formed by a plurality of grooves (may also be referred to as chamber-forming grooves). The chamber-forming grooves have the same shape with each other provided to the top portion of the actuator 14. A side wall 33 serving as a driving element of the pressure chamber 31 is formed between the neighboring grooves. At least one side wall 33 is provided between the adjacent pressure chamber 31 and dummy chamber 32 and changes a volume of the pressure chamber 31 according to a drive signal. At least one dummy chamber 32 is provided between the adjacent pressure chambers 31. The dummy chamber 32 may be closed by, for example, a cover material or a cover member.

The pressure chambers 31 and the dummy chambers 32 are alternately arranged with each other in a row running in parallel with a longitudinal direction (X-axis) of the actuator 14 (see FIG. 2, for example) and are respectively separated from each other by the side wall 33 provided therebetween. Each of the pressure and dummy chambers 31 and 32 extends in a direction (Y-axis) intersecting the longitudinal direction of the actuator 14. A longitudinal direction or an extending direction of each of the pressure and dummy chambers 31 and 32 is thus in the first direction along Y-axis.

The ejection nozzles 28 of the nozzle plate 12 are open to the corresponding pressure chambers 31.

As shown in FIG. 4, one end portion of each of the pressure chambers 31 in the chamber extending direction (Y-axis) is open to the corresponding supply chamber 161 which is, or constitutes part of, the common chamber 16 on an ink inflow side. Another end portion of the pressure chamber 31 opposite to the first end portion is closed by the frame member 13. That is, one end (first end) of the pressure chamber 31 is open to the supply chamber 161 and the other end is closed (blocked). Therefore, ink flows in from one end of the pressure chamber 31.

That is, the pressure chamber 31 forms a non-circulation flow path in which an inflow unit 311 is provided at one side of the flow path and the other side of the flow path is closed. The pressure chamber 31 forms the flow path through which the ink flows along the first direction (Y-axis). The other end (second end) portion of the pressure chamber 31 communicates with the primary side of the discharge hole 26 which is open during a normal operation, whereas the secondary side of the discharge hole 26 opposite to the primary side is normally kept closed. Therefore, during the normal, ejection operations, ink does not substantially flow out from the discharge hole 26. Then, for example, during maintenance, the secondary side of the discharge hole 26 is opened, and the ink flows into the discharge hole 26 and is discharged from the opened secondary side.

Electrodes 34 is provided for each of the pressure chambers 31 and the dummy chamber 32. Each electrode 34 is, for example, formed of a nickel thin film. The electrode 34 covers at least an inner surface of each of the corresponding pressure chambers 31 as shown in FIG. 6.

An ink chamber is formed as region surrounded (enclosed) by the base plate 11, the nozzle plate 12, and the frame member 13. The ink chamber is between the base plate 11 and the nozzle plate 12.

Pattern wirings are formed on the mounting surface 21 of the base plate 11. The pattern wiring is formed by, for example, a nickel thin film. The pattern wirings may have a common pattern or individual pattern distinct for each electrode 34 or the like, and. Each pattern has a predetermined pattern shape that leads to the corresponding electrode 34 in the actuator 14.

The nozzle plate 12 is formed of, for example, a rectangular film made of polyimide. The nozzle plate 12 faces the mounting surface 21 of the base plate 11. The nozzle plate 12 includes the plurality of ejection nozzles 28 that penetrate the nozzle plate 12 in the thickness direction. Each ejection nozzle 28 ejects ink from the pressure chamber 31 in the ejection direction (Z-axis) perpendicular to the flow direction (Y-axis) of the ink.

The number of the ejection nozzles 28 is the same as that of the pressure chambers 31, and each ejection nozzle 28 faces and communicates with the corresponding pressure chamber 31. One ejection nozzle 28 corresponds to one pressure chamber 31. Each ejection nozzle 28 may have, for example, a cylindrical shape with a circular cross section. A diameter of the cylindrical shape may be constant or may decrease in a central portion along the axial direction of the generally cylindrical shape or at a tip (end) portion of the generally cylindrical shape. If a part of the diameter of the nozzle is reduced, the decreased diameter is taken as the diameter of the ejection nozzle 28.

The ejection nozzle 28 is arranged at a position away from a center of the pressure chamber 31 in the ink flow direction, that is the first direction (Y-axis), by a predetermined distance. For example, as shown in FIG. 4, the position of the ejection nozzle 28 is closer to the inflow unit 311 of the pressure chamber 31 on the ink inflow side upstream from a central portion of the pressure chamber 31 in the ink flow direction (Y-axis). That is, the ejection nozzle 28 is closer to the supply chamber 161 from a center position that is one half L/2 of a length (or a flow path length) L of the pressure chamber 31 in the ink inflow direction. The ejection nozzle 28 is thus at a position away from a cover frame 131 (see FIG. 5) of the frame member 13 provided at the second end portion of the pressure chamber 31 and closer to end portion 321 of the pressure chamber 31.

In one instance, the flow path length L is the length of the pressure chamber 31 in the first direction (Y-axis) and is a distance from the inflow unit 311 opened to the supply chamber 161 by the chamber-forming side wall 33 at the first end portion to the cover frame 131 at the second end portion. As one example, the position of the ejection nozzle 28 is away from the center of the pressure chamber 31 in the first direction by a distance of L×¼ (=L/4) or less (that is, by a distance equal to and less than one quarter L/4 of the length L of the flow path in the flow direction). If the distance of the ejection nozzle 28 from the supply chamber 161 is set to L1, then L1<L×½ (=L/2) (see FIG. 4). If the ejection nozzle 28 is away from the center of the pressure chamber 31 in the first direction by a distance of more than L/4, there is a higher possibility that the pressure in the ink chamber is not sufficiently transmitted to the ejection nozzle 28 and that an ejection failure occurs. However, in the first embodiment, desirable ejection performance can be achieved by setting the distance of the ejection nozzle 28 from the center of the pressure chamber 31 to L/4 or less.

The frame member 13 is formed of, for example, a nickel alloy in a rectangular frame shape. As shown in FIG. 1, the frame member 13 is interposed between the mounting surface 21 of the base plate 11 and a bottom or back surface (when viewed as in the drawing) of the nozzle plate 12. The frame member 13 is bonded to the base plate 11 and the nozzle plate 12. The nozzle plate 12 is attached to the base plate 11 via the frame member 13. The frame member 13 includes the cover frame 131 that surrounds the ink chamber and closes the second end side of the pressure and dummy chambers 31 and 32. The end portions of the pressure and dummy chambers 31 and 32 are thus closed by the cover frame 131.

As shown in FIG. 1, the manifold 18 has a plate shape or a block shape elongated in one direction (X-axis). The manifold 18 is joined to the base plate 11 on a side opposite to the nozzle plate 12 (that is, on a surface not facing the nozzle plate 12). The manifold 18 includes the ink supply section, which is a flow path that communicates with the supply holes 25.

The inkjet head 10 of the first embodiment further includes a circuit board 17. The circuit board 17 is, for example, a film carrier package (FCP) or flexible circuit board and includes a film 51 and one or more integrated circuits (ICs) 52.

The film 51 is made of, for example, resin and is a flexible film. A plurality of wirings are formed onto the film 51. The FCP may also be referred to as a tape carrier package (TCP). The film 51 is provided by, for example, tape-automated bonding (TAB). An end portion of the film 51 is, for example, thermocompression-bonded to the pattern wiring on the mounting surface 21 of the base plate 11 by an anisotropic conductive film (ACF) 53.

The ICs 52 are connected to the wirings of the film 51. The ICs 52 are for applying a voltage or a drive voltage to the electrodes 34. Each IC 52 is fixed to the film 51 by, for example, resin. The IC 52 is electrically connected to the electrodes 34 via the wirings of the film 51 and the pattern wirings on the mounting surface 21 of the base plate 11.

In a case where the inkjet head 10 is installed in an inkjet printer, for example, based on a signal input from a control unit of the inkjet printer, the IC 52 applies a first drive voltage to the electrode 34 of the pressure chamber 31 via the wiring of the film 51. A potential difference is generated between the electrode 34 of the pressure chamber 31 to which the drive voltage has been applied and the electrode 34 of the dummy chamber 32 to which the drive voltage has not been applied, and the side wall 33 between the neighboring pressure and dummy chambers 31 and 32 is selectively deformed in the shear mode. The deformation of the side wall 33 in response to the drive signal causes the volume of the pressure chamber 31 and that of the dummy chamber 32 to change at the same time.

The shear-mode deformation of the side wall 33 increases the volume of the pressure chamber 31, which in turn decreases the pressure inside the pressure chamber 31. As a result, ink in the supply chamber 161 flows into the pressure chamber 31. At the same time, the volume of the dummy chamber 32 adjacent to the pressure chamber 31 decreases, and the pressure inside the dummy chamber 32 increases. The increase in the pressure of the dummy chamber 32 causes ink in the dummy chamber 32 to flow out from one end portion of the dummy chamber 32 to the supply chamber 161 to reduce the pressure change in the dummy chamber 32.

While the pressure chamber 31 is in the state of volume increase, the IC 52 applies a second drive voltage of an opposite potential to that of the first drive voltage to the electrode 34 of the volume-increased pressure chamber 31. This deforms the side wall 33 in the shear mode, causing both volume decrease and pressure increase of the pressure chamber 31. As a result, the ink in the pressure chamber 31 is pressurized or compressed and is ejected from the ejection nozzle 28 that communicates with the pressure chamber 31.

According to the inkjet head 10 of the first embodiment, a bubble in ink can be easily removed.

In general, in an inkjet head, bubble entrainment or bubble entrapment may occur at an ejection nozzle, which prevents ink from being ejected, and a bubble may enter a pressure chamber. Additionally, or alternatively, bubble nuclei in ink near an ejection nozzle may grow into a bubble due to a pressure change during ink ejection. If a bubble exists in a pressure chamber, a pressure for ink ejection is absorbed and the required pressure cannot be obtained. This causes a non-ejection or clogging issue and hinders an ink ejection operation.

A direction of movement of a bubble due to driving of the actuator varies depending on a location or a position of the bubble in the pressure chamber in its longitudinal direction or ink inflow direction. If a bubble exists on an ink inflow side or a common chamber side rather than at a position one half of a flow path length in the ink inflow direction, once the actuator is driven, the bubble moves more to the common chamber side for removal, and the ink ejection operation returns to normal. On the other hand, if a bubble exists farther than the ink inflow side (the common chamber side), once the actuator is driven, the bubble moves to an opposite side of the common chamber, hindering the ejection operation.

Figure 9:
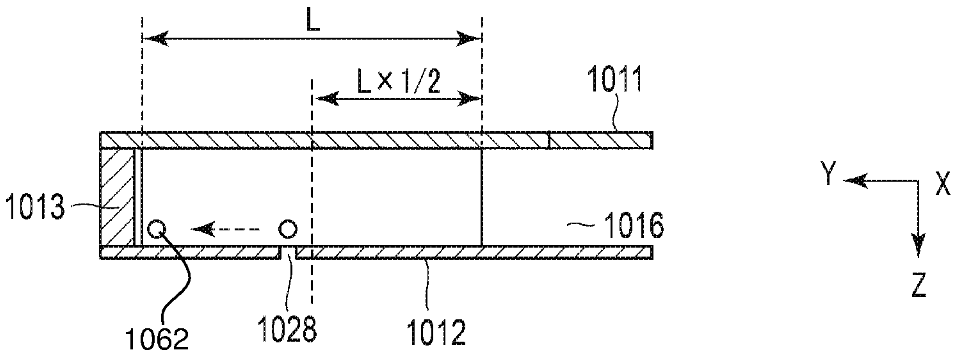
FIG. 9 is an explanatory diagram of a behavior of a bubble in an inkjet head according to a comparative example.

An inkjet head shown in FIG. 9 is a comparative example and has a configuration in which an ejection nozzle 1028 is beyond the central portion (midpoint) of the pressure chamber from the inflow side, and thus a bubble 1062 remains in the vicinity of an ejection nozzle 1028 as an obstruction to ink ejection. Except for the position of the ejection nozzle 1028, the comparative example has the same configuration as that of the inkjet head 10 unless otherwise noted. The comparative example includes a base plate 1011, a nozzle plate 1012, a cover frame 1013, and a supply chamber 1016 which substantially correspond to the base plate 11, the nozzle plate 12, the cover frame 131, and the supply chamber 161 of the inkjet head 10), respectively.

On the other hand, the inkjet head 10 according to the first embodiment includes the ejection nozzle 28 that ejects ink in the ejection direction (Z-axis) perpendicular to the ink inflow direction (Y-axis) of the pressure chamber 31. As shown in FIG. 5, the position of the ejection nozzle 28 (where a bubble may be generated) is arranged closer to the ink inflow side than the central portion (midpoint) of the pressure chamber 31 along the flow direction. As shown in FIG. 8, such a positioning of the ejection nozzle 28 can make the bubble 62 that has been entrained at the ejection nozzle 28 move towards the common chamber 16 by driving the actuator 14. Therefore, the driving of the actuator 14 moves the bubble 62 to the supply chamber 161 so that the bubble 62 can be removed from the pressure chamber 31. This way, a stable ink ejection operation can be performed without hinderance or obstruction due to a bubble. Also, since generally the bubble 62 that is generated at such a position is small compared to the volume of the common chamber 16, the bubble 62 is only a negligible hindrance to the ejection operation.

Accordingly, in the inkjet head 10 of the present embodiment, a bubble that has been created in the vicinity of the ejection nozzle 28 can be easily removed.

Second Embodiment

Figure 10:
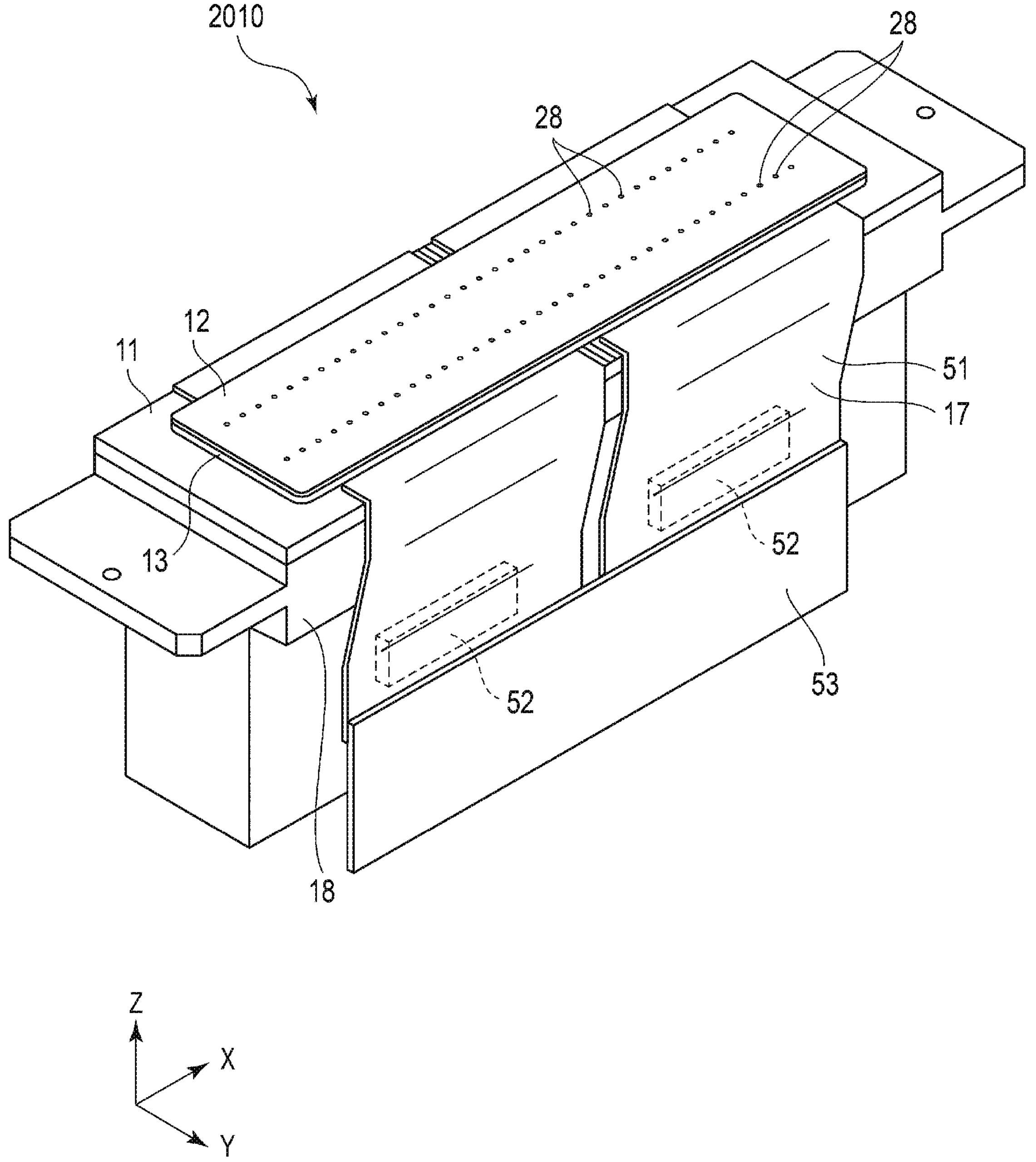
FIG. 10 depicts an inkjet head in a perspective view according to a second embodiment.
Figure 11:
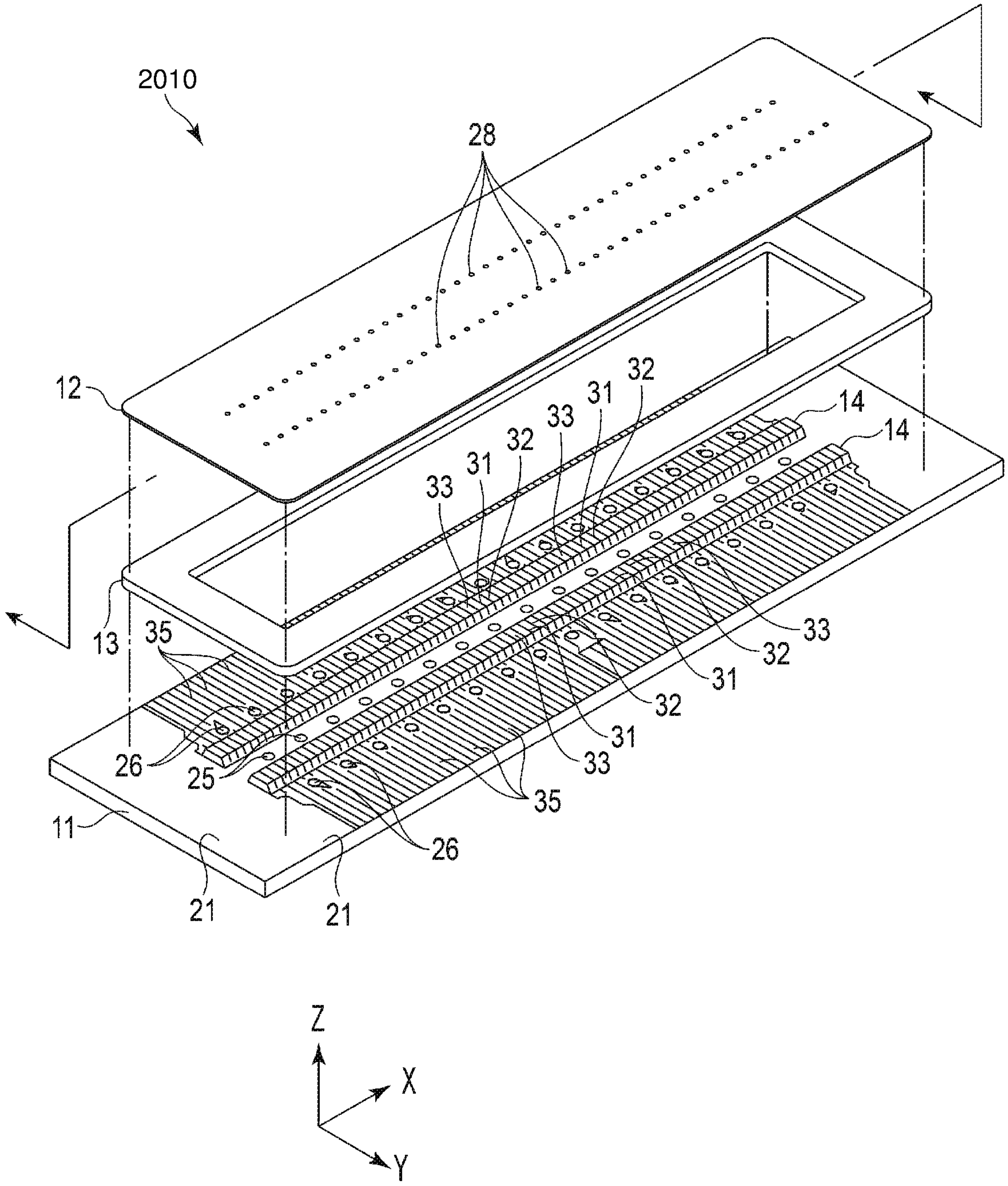
FIG. 11 depicts an inkjet head in an exploded perspective view according to a second embodiment.
Figure 12:
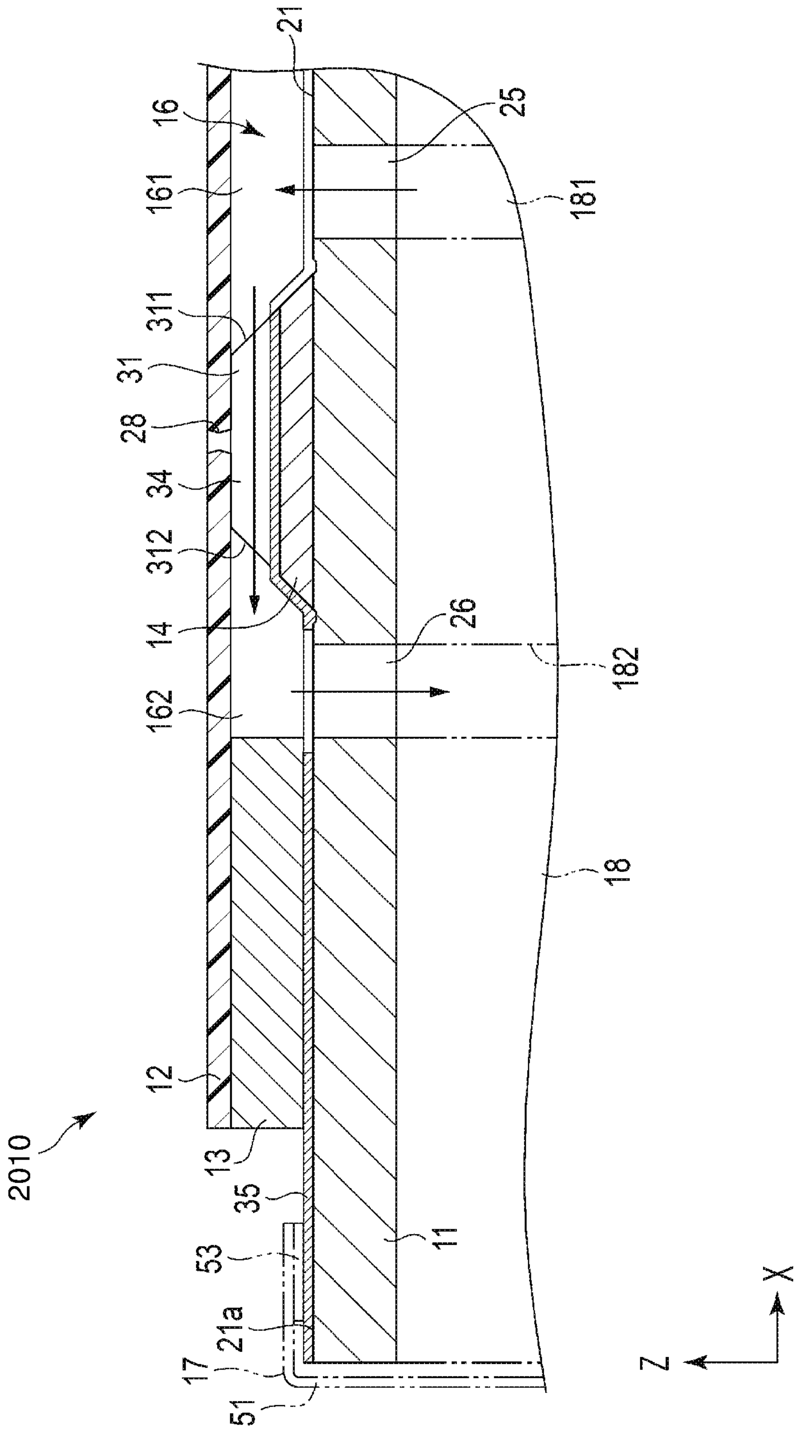
FIG. 12 depicts a partial configuration of an inkjet head in a cross-sectional view according to a second embodiment.
Figure 13:
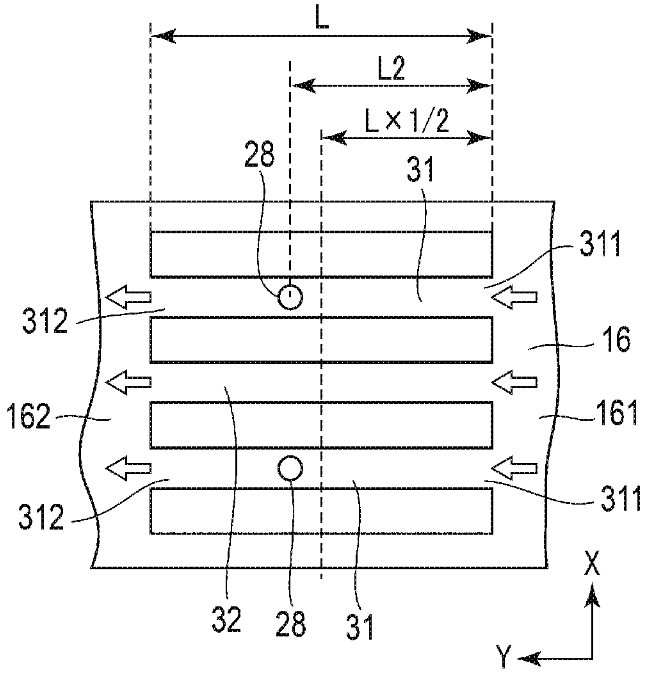
FIG. 13 depicts a partial configuration of an inkjet head in a cross-sectional view according to a second embodiment.
Figure 14:
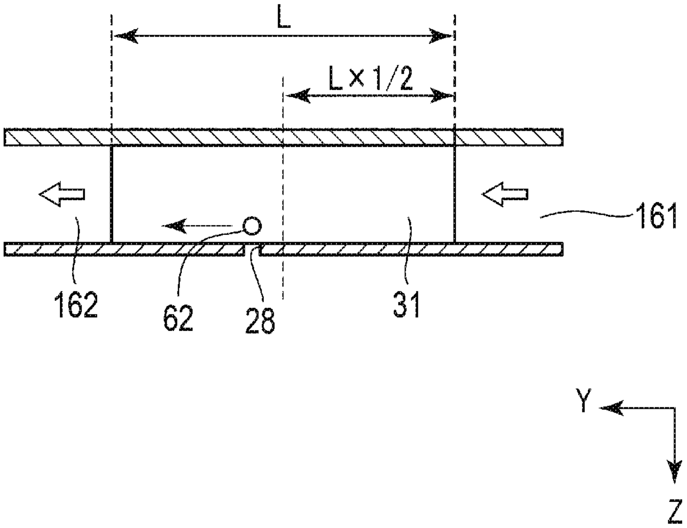
FIG. 14 is an explanatory diagram of a behavior of a bubble in an inkjet head according to a second embodiment.

An inkjet head 2010 as one example of a liquid ejection head according to a second embodiment will be described with reference to FIGS. 10 to 14. FIG. 10 is a perspective view showing the configuration of the inkjet head, FIG. 11 is an exploded perspective view, and FIG. 12 is a cross-sectional view of the inkjet head. FIG. 13 is a plan view schematically showing a configuration of a part of the inkjet head, and FIG. 14 is a cross-sectional view of a part of the inkjet head.

The inkjet head 2010 according to the second embodiment is a side shooter type inkjet head with a shear-mode shared wall design. The inkjet head 2010 has a circulation structure (or is of a circulation type) in which common chambers 16 are provided at opposite sides of the inkjet head 2010. Configurations, components, elements, and the like of the inkjet head 2010 that are common to or similar to those of the inkjet head 10 of the first embodiment are denoted by the corresponding reference signs, numbers, and the like, and descriptions thereof may be omitted. The inkjet head 2010 is a device configured to eject ink (one example of a fluid or liquid) and is, for example, installed in an inkjet printer. In the second embodiment, as one example, each common chamber 16 includes the supply chamber 161 and the discharge chamber 162 at one side and another side of the common chamber 16, respectively.

The inkjet head 2010 includes the base plate 11, the nozzle plate 12, and the frame member 13. The base plate 11 is an example of a base member. The inkjet head 2010 also includes the ink chamber to which ink is supplied.

The inkjet head 2010 further includes the circuit board 17 for controlling the inkjet head 2010 and the manifold 18 that forms part of the path between the inkjet head 2010 and the ink tank. The inkjet head 2010 may include other components as appropriate.

As shown in FIGS. 10 and 11, the base plate 11 is formed in a rectangular plate shape by ceramics, such as alumina. The base plate 11 includes the flat mounting surface 21. The mounting surface 21 includes the plurality of supply holes 25, the plurality of discharge holes 26, and the pair of actuators 14.

As shown in FIG. 11, the plurality of supply holes 25 are provided next to each other in one row running in the longitudinal direction of the base plate 11 and at the central portion of the base plate 11. Each supply hole 25 communicates with the ink supply section of the manifold 18 and is connected to the ink tank via the ink supply section. Ink in the ink tank is supplied to the supply chamber 161 via the supply holes 25.

As shown in FIG. 1, the discharge holes 26 are provided side by side along two rows that run in the longitudinal direction of the base plate 11 and have the supply holes 25 and the pair of actuators 14 interposed therebetween. Each discharge hole 26 communicates with an ink discharge section 182 of the manifold 18 as shown in FIG. 12. The discharge holes 26 are connected to the ink tank via the ink discharge section 182. The ink in the ink chamber is discharged from the discharge hole 26 to the ink tank. In this manner, the ink circulates between the ink tank and the ink chamber.

The pair of actuators 14 are bonded to the mounting surface 21 of the base plate 11. The pair of actuators 14 are arranged in two parallel rows each running in the longitudinal direction of the base plate 11 with the row of the supply holes 25 interposed therebetween. Each actuator 14 is formed using, for example, two plate-shaped piezoelectric bodies made of lead zirconate titanate (PZT). The two piezoelectric bodies are bonded to each other so that polarization directions thereof are opposite to each other in a thickness direction. The actuator 14 is bonded to the mounting surface 21 by, for example, a thermosetting epoxy adhesive. As shown in FIGS. 11 and 12, the actuators 14 are arranged in parallel with each other in the ink chamber to correspond to the ejection nozzles 28 of the nozzle plate 12 arranged in two rows. The actuator 14 divides the ink chamber into the supply chamber 161, which the corresponding supply hole 25 is open to and communicate with, and two discharge chambers 162, each of which the discharge hole 26 is open to and communicates with.

Each actuator 14 of the pair has a trapezoidal shape in cross-section. A top portion of the actuator 14 is bonded to a bottom surface (as viewed in the drawing) of the nozzle plate 12. The actuator 14 includes the plurality of pressure chambers 31 and the plurality of dummy chambers 32 arranged alternately with each other. The pressure and the dummy chambers 31 and 32 each are formed by the grooves (or the chamber-forming grooves) that have the same shape with each other on the top portion of the actuator 14. Alternatively, the shapes of the pressure chamber 31 and dummy chamber 32 or the shapes of the chamber-forming grooves may be different from each other.

At least one side wall 33 serving as a driving element is formed between the neighboring chamber-forming grooves. The side wall 33 changes the volume of the pressure chamber 31 and that of the dummy chamber 32 at the same time according to a drive signal.

The pressure chambers 31 and the dummy chambers 32 are alternately arranged with each other in the row running in parallel with the longitudinal direction (X-axis) of the actuator 14 and are respectively separated from each other by the side wall 33 provided therebetween. Each of the pressure and the dummy chambers 31 and 32 extends in the direction (Y-axis) intersecting the longitudinal direction of the actuator 14.

The ejection nozzles 28 of the nozzle plate 12 are open to the corresponding pressure chambers 31. One end portion (or the first end portion) of each of the pressure chambers 31 in the first direction (Y-axis) is open to the corresponding supply chamber 161 which constitutes at least part of the common chamber 16 on the inflow side as shown in FIG. 12. Another end portion (or the second end portion) of the pressure chamber 31 in the first direction (Y-axis) is open to the discharge chamber 162 which constitutes at least part of the common chamber 16 on the outflow side. That is, both end portions of the pressure chamber 31 are open to and communicate with the common chamber 16. Therefore, ink flows in from and out from the first and second end portions of the pressure chamber 31, respectively.

In some examples, a plurality of dummy nozzles that are open to and communicate with a corresponding dummy chambers 32 may be provided.

One end portion of the dummy chamber 32 is open to the supply chamber 161 of the common chamber 16. Another end portion of the dummy chamber 32 is open to the discharge chamber 162 of the common chamber 16. That is, both end portions of the dummy chamber 32 are open to and communicate with the common chamber 16. Therefore, ink flows in and flows out from one end portion and another end portion of the dummy chamber 32, respectively.

The electrode 34 is provided to each of the pressure and dummy chambers 31 and 32. The electrode 34 is, for example, formed by a nickel thin film in a layer shape. The electrode 34 covers at least the inner surface of each of the corresponding pressure and the dummy chambers 31 and 32.

The ink chamber is formed by being surrounded by the base plate 11, the nozzle plate 12, and the frame member 13. The ink chamber is arranged between the base plate 11 and the nozzle plate 12. The ink chamber includes the common chamber 16, the pressure chamber 31, and the dummy chamber 32.

As shown in FIG. 11, pattern wirings 35 are provided to the mounting surface 21 of the base plate 11. Each pattern wiring 35 is formed by, for example, a nickel thin film. The pattern wirings 35 have a common pattern with each other or individual patterns different from each other. Each pattern wiring has a predetermined pattern shape that leads to the corresponding electrode 34 in the actuator 14.

The nozzle plate 12 is formed by, for example, a rectangular film made of polyimide. The nozzle plate 12 faces the mounting surface 21 of the base plate 11. The nozzle plate 12 includes the ejection nozzles 28 and dummy nozzles (if present) that penetrate the nozzle plate 12 in the thickness direction (Z-axis).

The number of the ejection nozzles 28 is the same as that of the pressure chambers 31, and each ejection nozzle 28 faces and communicates with the corresponding pressure chamber 31. One ejection nozzle 28 corresponds to one pressure chamber 31. Each ejection nozzle 28 may have, for example, a cylindrical shape with a circular cross section. A diameter of the cylindrical shape may be constant or may decrease toward a central (middle) portion or a tip (end) portion. In the latter case, the decreased diameter represents the diameter of the ejection nozzle 28.

The ejection nozzle 28 is arranged at a position away from the center of the pressure chamber 31 in the ink flow direction (Y-axis) by a predetermined distance. For example, as shown in FIG. 13, the position of the ejection nozzle 28 is closer to an outflow unit 312 side on the downstream side from the central portion (midpoint) of the pressure chamber 31 along the ink flow direction (Y-axis). That is, the ejection nozzle 28 is offset from the midpoint (L/2 point) of the pressure chamber 31 towards the discharge chamber 162. The ejection nozzle 28 is thus at a position closer to the cover frame 131 provided at the second end portion of the pressure chamber 31.

The flow path length L is the length of the pressure chamber 31 along the ink flow direction (Y-axis) and is the distance from the inflow unit 311 opened to the supply chamber 161 at the chamber-forming side wall 33 at the first end portion to the outflow unit 312 opened to the discharge chamber 162 at the second end portion. As one example, the position of the ejection nozzle 28 on the outflow side or the downstream side of the flow path in the pressure chamber 31 is offset from the center (midpoint) of the pressure chamber 31 along the ink flow direction by a distance of L×¼ (=L/4) or less. If, as shown in FIG. 13, the distance of the ejection nozzle 28 from the supply chamber 161 is referred to as length L2, then length L2>length L/2. If the ejection nozzle 28 is offset from the center (midpoint) of the pressure chamber 31 by a distance of more than L/4, there is a higher possibility that the pressure in the ink chamber will not be sufficiently transmitted to the ejection nozzle 28 and that an ejection failure may occur. However, in the second embodiment, desirable discharge performance can be achieved by setting the distance of the ejection nozzle 28 from the midpoint to L/4 or less.

The frame member 13 is formed of, for example, a nickel alloy in a rectangular frame shape. As shown in FIGS. 10 and 11, the frame member 13 is interposed between the mounting surface 21 of the base plate 11 and a bottom or back surface (when viewed as in the drawing) of the nozzle plate 12. The frame member 13 is bonded to the based plate 11 and the nozzle plate 12. The nozzle plate 12 is attached to the base plate 11 via the frame member 13.

As shown in FIG. 10, the manifold 18 has a plate shape or a block shape elongated in one direction (X-axis) and is joined to the base plate 11 on a side opposite to the nozzle plate 12 (that is, on a surface not facing the nozzle plate 12). The manifold 18 includes the ink supply section configured to form a flow path that communicates with the supply hole 25 and the ink discharge section configured to form another flow path that communicates with the discharge hole 26.

As shown in FIG. 10, the inkjet head 2010 of the second embodiment further includes the circuit board 17. The circuit board 17 is, for example, a film carrier package (FCP) and includes the film 51 and one or more ICs 52.

The film 51 is made of, for example, resin and is a flexible film. The plurality of wirings are formed onto the film 51. The FCP may also be referred to as a tape carrier package (TCP). The film 51 is provided by, for example, tape automated bonding (TAB). An end portion of the film 51 is, for example, thermocompression-bonded to the pattern wiring 35 on the mounting surface 21 of the base plate 11 by an anisotropic conductive film (ACF) 53.

The ICs 52 are connected to the wirings of the film 51. The ICs 52 are for applying a voltage or a drive voltage to the electrodes 34. Each IC 52 is fixed to the film 51 by, for example, resin. The IC 52 is electrically connected to the electrodes 34 via the wirings of the film 51 and the pattern wirings 35 on the mounting surface 21 of the base plate 11.

In a case where the inkjet head 2010 is installed in an inkjet printer, for example, based on a signal input from a control unit of the inkjet printer, the IC 52 applies a drive voltage (or a first drive voltage) to the electrode 34 of the pressure chamber 31 via the wiring of the film 51. A potential difference is generated between the electrode 34 of the pressure chamber 31 to which the drive voltage has been applied and the electrode 34 of the dummy chamber 32 to which the drive voltage has not been applied, and the side wall 33 between the pressure and the dummy chambers 31 and 32 is selectively deformed in the shear mode. The deformation of the side wall 33 in response to the drive signal causes the volume of the pressure chamber 31 and that of the dummy chamber 32 to change at the same time.

The shear-mode deformation of the side wall 33 increases the volume of the pressure chamber 31, which in turn decreases the pressure inside the pressure chamber 31. As a result, ink in the supply chamber 161 flows into the pressure chamber 31. At the same time, the volume of the dummy chamber 32 adjacent to the pressure chamber 31 decreases, and the pressure inside the dummy chamber 32 increases. The increase in the pressure of the dummy chamber 32 causes ink in the dummy chamber 32 to flow out from both end portions of the dummy chamber 32 to the common chamber 16 on both sides to reduce the pressure change in the dummy chamber 32.

While the pressure chamber 31 is in the state of volume increase, the IC 52 applies another drive voltage (a second drive voltage) of an opposite potential to that of the first drive voltage to the electrode 34 of the volume-increased pressure chamber 31. This deforms the side wall 33 in the shear mode, causing both a volume decrease and a pressure increase of the pressure chamber 31. As a result, the ink in the pressure chamber 31 is pressurized or compressed and is ejected from the ejection nozzle 28 that communicates with the pressure chamber 31.

According to the inkjet head 2010 of the second embodiment, a bubble in ink can be easily removed.

In general, in an inkjet head, bubble entrainment or bubble entrapment may occur at an ejection nozzle, and such a bubble may enter a pressure chamber. Additionally, or alternatively, bubble nuclei in ink near an ejection nozzle may grow into a bubble due to the pressure changes during ink ejection. If a bubble exists in the pressure chamber, the pressure required for ink ejection can be absorbed (dissipated) and the required pressure increase for ejection might not be obtained. This causes a non-ejection or clogging issue and hinders subsequent ink ejection operations.

In such an inkjet head, the movement direction of a bubble with the actuator driving varies depending on the bubble's position in the pressure chamber along the chamber longitudinal direction (ink inflow direction).

For example, in a circulation type pressure chamber, if a bubble exists more than half way in the pressure chamber towards the ink outflow side (discharge chamber side) along the flow path length, the bubble moves farther towards the ink discharge chamber side with the driving of the actuator, and the ink ejection operation returns to normal if the bubble flows from the pressure chamber into the ink discharge chamber. On the other hand, if a bubble exists on an upstream side (less than half way towards the discharge chamber end), the bubble tends to move toward the ejection nozzle when the actuator is driven, likely hindering the ink ejection. Therefore, in the circulation-type inkjet head in which ink flows in from one end to the other end in the pressure chamber 31 to be discharged (recirculated), if the ejection nozzle is positioned on the upstream side, past the midpoint of the flow path length, the bubble is not ejected into the nozzle so that the discharge operation will not be hindered. On the other hand, in the inkjet head 2010 according to the second embodiment, as shown in FIG. 14, the position of the ejection nozzle 28 where a bubble may be generated is not at the midpoint of the flow path in the pressure chamber 31, but rather is closer to the ink discharge end than is the midpoint so that a bubble entrained at the ejection nozzle 28 moves to the discharge chamber 162 with a flow formed by driving the actuator 14. This way, it is possible not only to easily remove the bubble from the pressure chamber 31 or the discharge chamber 162 but also to perform a stable ink ejection operation without hinderance or obstruction from a bubble. The bubble which has moved to the discharge chamber 162 is removed from the inkjet head 2010 in the process of ink circulation. For example, during the ink circulation, the bubble at the discharge chamber 162 enters the ink tank provided in an ink circulation path and is removed or separated from the ink in the ink tank.

Accordingly, in the inkjet head 2010 as one example of the liquid ejection head of the second embodiment, a bubble that has been created in the vicinity of the ejection nozzle 28 in the pressure chamber 31 can be easily removed, and a further stable ink ejection operation can be achieved.

Third Embodiment

An inkjet recording device 100 according to a third embodiment including the inkjet head 2010 of the second embodiment installed thereto will be described with reference to FIG. 15. The inkjet recording device 100 includes a housing 111, a medium supply unit 112, an image forming unit 113, a medium discharge unit 114, a conveyance device 115, and a control unit 116.

The inkjet recording device 100 is one example of a liquid ejection device that performs an image forming process on a recording medium, such as a sheet of paper P, which is an ink ejection target, by ejecting thereto a liquid, such as ink, while conveying the recording medium along a predetermined conveyance path A from the medium supply unit 112 to the medium discharge unit 114 through the image forming unit 113.

The housing 111 forms an outer shell or defines an outline of the inkjet recording device 100. A discharge port for discharging the paper P after the image forming process outside the housing 111 is provided at a predetermined location of the housing 111.

The medium supply unit 112 includes a plurality of paper feed cassettes and is configured to hold a plurality of sheets of paper P prior to the image forming process. The sheets of paper P may have various sizes and are stacked on each other in the paper feed cassettes according to the sizes.

The medium discharge unit 114 includes a paper discharge tray configured to hold the paper P that has been discharged from the discharge port.

The image forming unit 113 includes a support unit 117 that supports the paper P during the image forming process and a plurality of head units 130 that are provided above the support unit 117 to face the paper P supported on the support unit 117.

The support unit 117 includes a conveyance belt 118 provided in a loop shape in a predetermined region for image formation on paper P, a support plate 119 that supports the conveyance belt 118 from its back side, and a plurality of belt rollers 120 provided on the back side of the conveyance belt 118.

Figure 15:
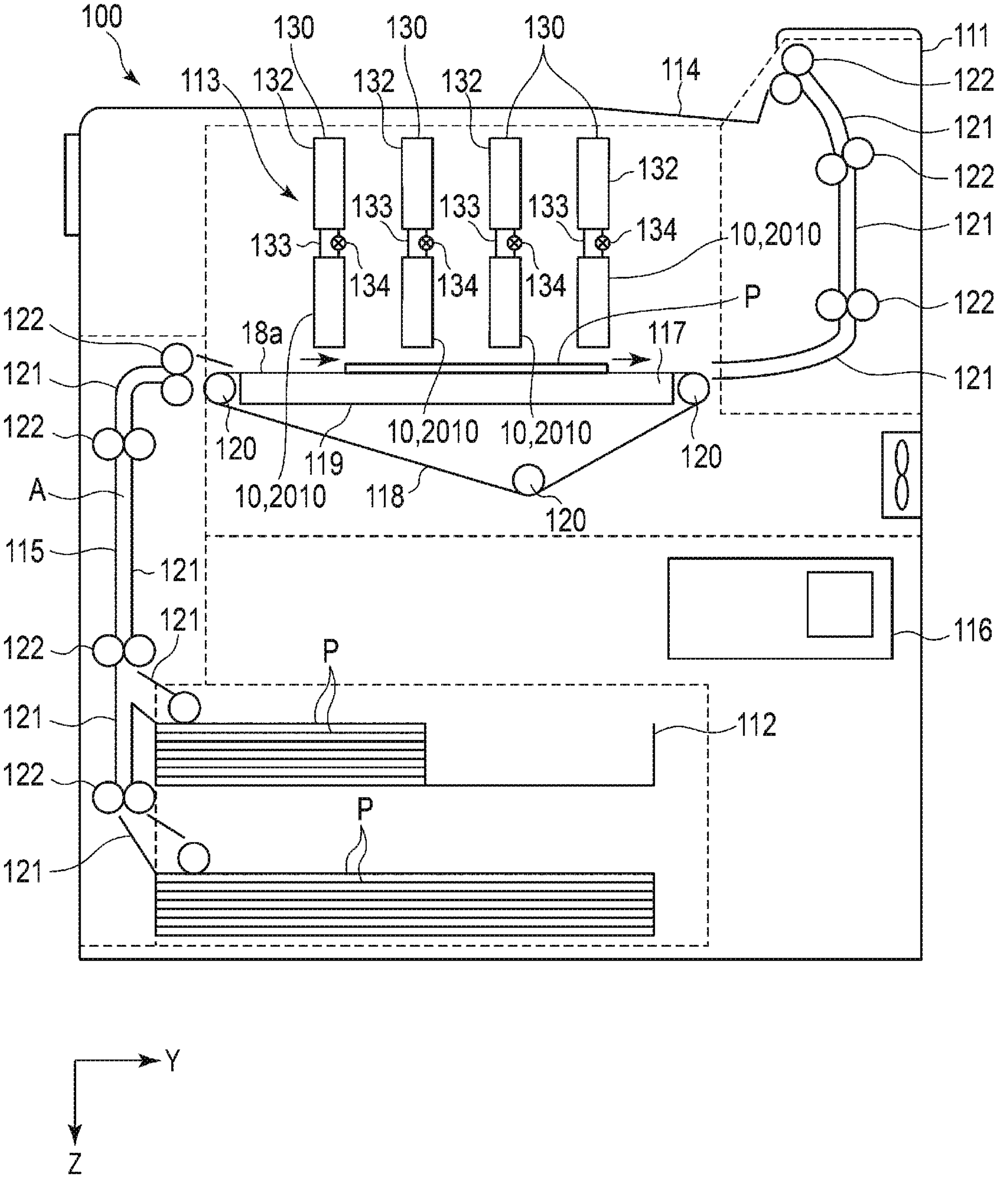
FIG. 15 is an explanatory diagram of a configuration of an inkjet recording device according to a third embodiment.

During the image formation process, the support unit 117 supports a sheet of paper P on its paper holding surface, which is an upper surface of the conveyance belt 118, and conveys the paper P downstream as indicated by an arrow in FIG. 15 by rotating the belt rollers 120 and sending the conveyance belt 118 forward at a predetermined timing.

In the present embodiment, there are four head units 130 in the image forming unit 113 for ejecting four colors of ink. Each head unit 130 designed for one color includes an ink tank 132, a connection flow path 133, a liquid feed pump 134, and the inkjet head 2010.

In the present embodiment, there are four colors of ink, for example, cyan, magenta, yellow, and black. The respective ink tank 132 of each head unit 130 contains one of the four color inks. Each ink tank 132 is connected to an inkjet head 2010 by a connection flow path 133. The inkjet head 2010 is of the circulation type that circulates ink between the inkjet head 2010 and the ink tank 132.

The connection flow path 133 includes a supply flow path and a recovery flow path. A negative pressure control device, such as a pump, may be connected to the ink tank 132. The negative pressure control device may control an internal pressure of the ink tank 132 to be a negative pressure in accordance with a hydraulic head value of or a hydraulic head pressure difference between the inkjet head 2010 and the ink tank 132 so that the ink supplied to each ejection nozzle 28 of the inkjet head 2010 is formed into a meniscus having a predetermined shape.

The liquid feed pump 134 is, for example, a piezoelectric pump. The liquid feed pump 134 is provided in the supply flow path of the connection flow path 133. The liquid feed pump 134 is connected to a drive circuit of the control unit 116 by wiring and is controlled by a central processing unit (CPU). The liquid feed pump 134 supplies liquid in the ink tank 132 to the inkjet head 2010 and circulates the liquid with a circulation flow path including the inkjet head 2010 and the ink tank 132.

The conveyance device 115 moves paper P along the conveyance path A from the medium supply unit 112 through the image forming unit 113 to the medium discharge unit 114. The conveyance device 115 includes a plurality of guide plates 121 disposed in pairs along the conveyance path A and a plurality of conveyance rollers 122.

The guide plates 121 are disposed in pairs of plate face each other with a space for the paper P to pass therebetween along the conveyance path A.

The conveyance rollers 122 are driven to rotate by the control unit 116 so that paper P moves in the downstream direction along the conveyance path A. One or more sensors for detecting a conveyance state of paper P are provided along the conveyance path A.

The control unit 116 includes a control circuit as a controller, such as a CPU, a read only memory (ROM) that stores various programs and the like, a random-access memory (RAM) that temporarily stores various variable data and image data, and an interface unit that receives and output data from and to an external device.

In the inkjet recording device 100, upon detection of a print instruction entered by a user who operates an operation input unit of an operation interface of the inkjet printer 100, the control unit 116 drives the conveyance device 115 to convey the sheet of paper P along the conveyance path A and outputs one or more print signals to the respective head units 130 at a predetermined timing to drive the inkjet heads 2010. As part of the ejection operation, each of the inkjet head 2010 sends a drive signal to the IC 52 in response to an image signal corresponding to the image data temporarily stored in the RAM, applies a drive voltage to the electrodes 34 of the pressure chambers 31 via the wirings, selectively drive the side walls 33 of the actuators 14, eject ink from the ejection nozzles 28, and forms an image on the paper P held on the conveyance belt 118.

Also, as part of the liquid ejection operation, the control unit 116 drives the liquid feed pump 134 to supply the ink in the ink tank 132 to the inkjet head 2010 through the circulation flow path.

Other Embodiments/Modified Embodiments

For example, in the first embodiment, the dummy chamber 32 is arranged between the neighboring pressure chambers 31. However, embodiments are not limited thereto. For example, the plurality of pressure chambers 31 may be provided directly adjacent to each other with no dummy chamber 32 therebetween and separated by just one side wall 33 (a shared wall).

Figure 16:
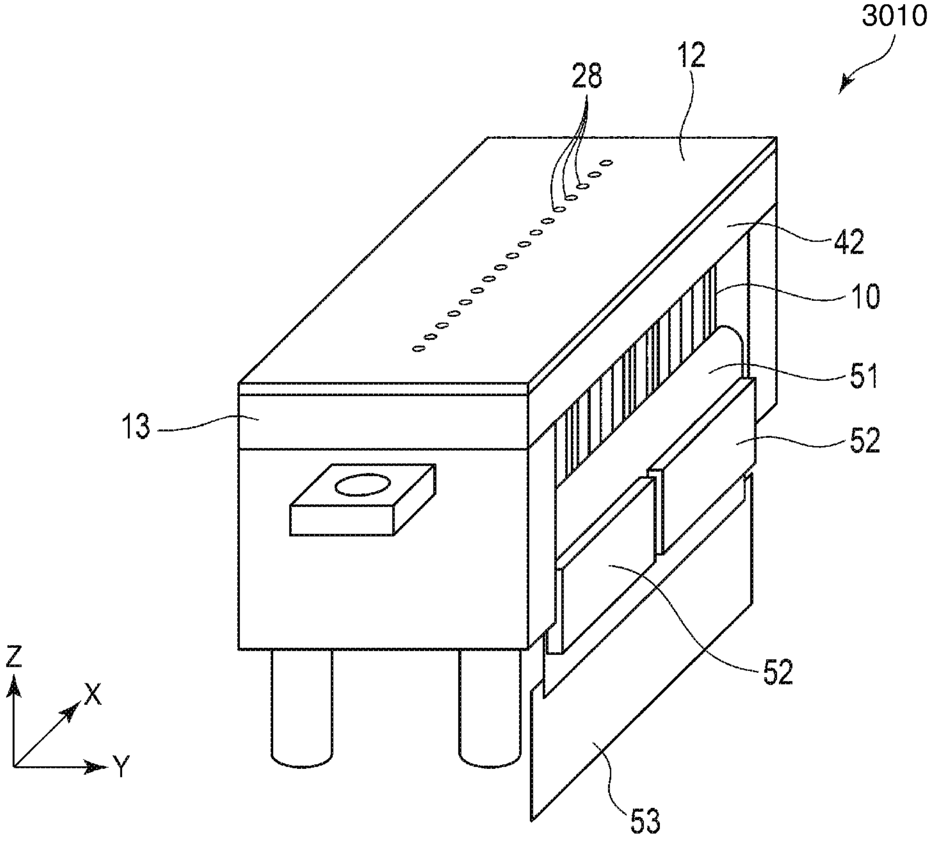
FIG. 16 depicts a partial configuration of a liquid ejection head in a perspective view according to a modified embodiment.
Figure 17:
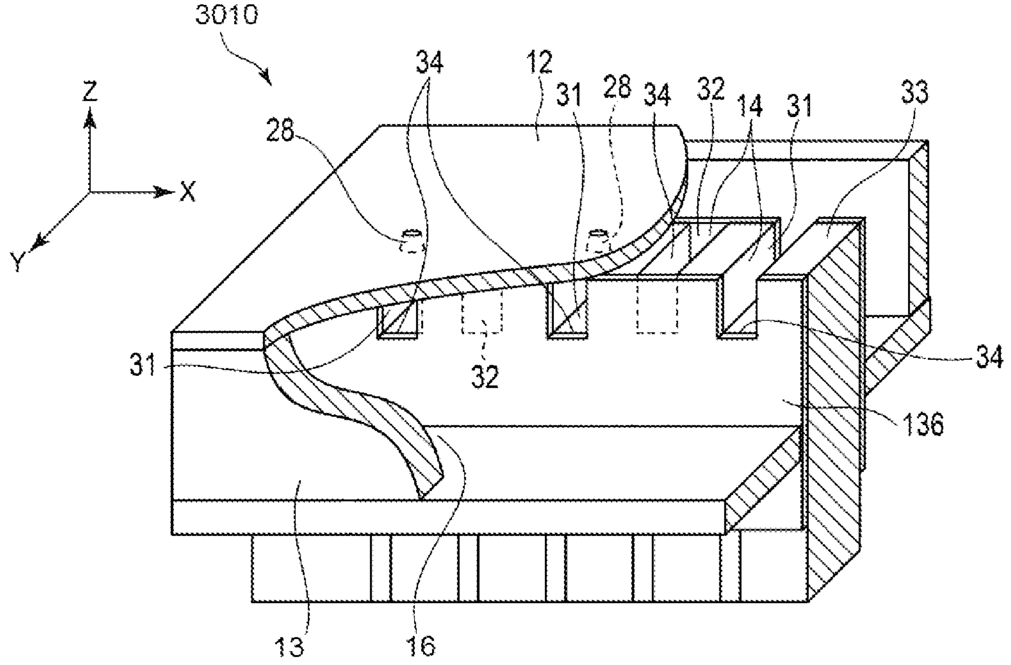
FIG. 17 depicts a partial configuration of a liquid ejection head in a perspective view according to a modified embodiment.

As another embodiment, an inkjet head 3010 is shown in FIGS. 16 and 17. In the inkjet head 3010, the actuator 14 having the plurality of chamber-forming grooves is formed on an end surface of the base plate 11. The inkjet head 3010 is a side shooter type inkjet head with a shear-mode shared wall design. The inkjet head 3010 has a circulation structure or is of a circulation type in which the common chambers 16 are provided at opposite sides of the inkjet head 3010 in the first direction (Y-axis) in a similar manner to the circulation-type inkjet head 2010 of the second embodiment. The inkjet head 3010 is configured to eject ink and installed in, for example, an inkjet printer.

The inkjet head 3010 includes the base plate 11, the nozzle plate 12, and the frame member 13. In the inkjet head 3010, the ink chamber to which ink is supplied is also provided.

In the inkjet head 3010, each base plate 11 is arranged to be along a liquid discharge direction, and a plurality of base plates 11 are disposed in parallel. In the inkjet head 3010, the frame member 13 includes a cover frame 131 that surrounds the ink chamber and a cover plate 136 that closes the dummy chamber 32 as shown in FIG. 17. Other configurations, components, and elements are the same as, common to, or similar to those of the inkjet head 2010 of the second embodiment unless otherwise noted.

The inkjet head 3010 according to the third embodiment is also of the circulation type including the discharge ejection nozzles 28 in a row along a perpendicular direction (X-axis) to the ink inflow direction (Y-axis) of the pressure chambers 31. Furthermore, each of the ejection nozzles 28 (at which a bubble may be generated) is positioned (offset) to be closer to the ink discharge side than the midpoint of pressure chamber 31. Accordingly, a bubble entrained at the ejection nozzle 28 can move to the discharge chamber 162 when the actuator 14 is driven. Therefore, according to the inkjet head 3010, a bubble can be removed from the discharge chamber 162 in the process of circulation, and ink ejection will not be obstructed by a trapped bubble, so that a stable ejection operation can be performed.

Certain examples have just one discharge nozzle 28 for each pressure chamber 31, but embodiments are not limited thereto. For example, each pressure chamber 31 may have two or more discharge nozzles 28 corresponding thereto. In such cases, at least one of the discharge nozzles 28 can be disposed at a location offset from the midpoint of the pressure chamber 31 in the flow direction by some predetermined distance, thereby allowing bubbles to be removed more easily.

In some examples, such as in a non-circulation type flow path configuration in which just one end of a pressure chamber 31 communicates with a supply chamber 161 and the other end is closed, the discharge nozzle 28 can be disposed closer to the upstream side than the center (midpoint) of the pressure chamber 31 so that a bubble near the ejection nozzle 28 can be moved to the supply chamber 161 and removed from the pressure chamber 31.

In a circulation type flow path configuration in which both ends of the pressure chamber 31 (or the like) communicate with a common chamber on the fluid circulation path (e.g., one end is connected to a supply chamber and the other end is connected to a discharge chamber), each ejection nozzle can be offset to be closer to the downstream than the center (midpoint) of the pressure chamber 31 so that a bubble near the ejection nozzle 28 can move to the discharge side and be removed from the pressure chamber 31.

While a circulation-type inkjet head 2010 of the second embodiment can be mounted in an inkjet recording device 100, a non-circulation type inkjet head 10 may be used instead in other examples. In the latter case, ink is supplied from the ink tank 132 and is discharged or removed to a maintenance device or the like during a maintenance operation or the like.

In one embodiment, the inkjet recording device 100 is an inkjet printer that forms a two-dimensional image on a paper P with ink. However, in other examples, the inkjet recording device 100 is not limited thereto. For example, the inkjet recording device 100 may be a 3D printer, an industrial manufacturing machine, a medical machine, or the like. In the case of a 3D printer, a three-dimensional object can be formed by ejecting a material or a binder for solidifying another material from the inkjet head(s).

The number of the inkjet heads, the colors, and characteristics of the ink(s) to be used, and the like can be changed as appropriate. In various examples, transparent glossy ink, ink that develops a color upon irradiation with infrared rays or ultraviolet rays, or another special ink type can be used. The inkjet head 10 may be capable of discharging a liquid other than ink. Such a liquid may be a dispersion liquid such as a suspension with solids therein. Examples of liquids other than the ink that may be discharged by an inkjet head 10 include, but are not limited to: a dispersion liquid, a liquid suspension, a liquid for forming a wiring pattern on a printed wiring circuit board, a photoresist material or the like, a liquid containing a cell for artificially forming or growing a tissue or an organ; a binder such as an adhesive, a wax, and a liquid resin precursor.

According to the present disclosure a liquid discharge head and/or a liquid discharge device according to at least one embodiment provides a mechanism by which bubbles that are either entrained or generated can be removed from pressure chambers of an inkjet head, liquid discharge head, or the like.

While certain embodiments have been described, these embodiments are presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a pressure chamber extending in a first direction from a first end to a second end as a flow path for a fluid; and a nozzle for ejecting liquid from the pressure chamber in a second direction intersecting the first direction, the nozzle being at a position offset from a midpoint of the pressure chamber in the first direction towards one of the first or second ends of the pressure chamber, wherein the first end is open to a first common chamber from which fluid can flow into the pressure chamber, and the second end is open to a second common chamber into which fluid can flow from the pressure chamber.

2. The liquid ejection head according to claim 1, wherein the nozzle is closer to the second end than the first end.

3. The liquid ejection head according to claim 1, wherein the nozzle is at a position less than one-half the total length of the pressure chamber in the first direction from the second end.

4. The liquid ejection head according to claim 1, wherein the nozzle is offset from the midpoint of the pressure chamber in the first direction by one-quarter or less of the total length of the pressure chamber in the first direction.

5. A liquid ejection head, comprising:

a plurality of pressure chambers, each extending in a first direction from a first end to a second end as a flow path for a fluid, each pressure chamber having a nozzle for ejecting liquid from the respective pressure chamber in a second direction intersecting the first direction, the nozzle being at a position offset from a midpoint of the pressure chamber in the first direction towards one of the first or second ends of the pressure chamber, the pressure chambers being spaced from each other in a third direction intersecting the first and second directions, wherein the first ends of the plurality pressure chambers are open to a common chamber from which fluid can flow into the pressure chambers, and the second ends of the plurality of pressure chambers are closed to fluid flow.

6. The liquid ejection head according to claim 5, wherein each nozzle is closer to the first end of the respective pressure chamber than the second end of the respective pressure chamber.

7. The liquid ejection head according to claim 5, further comprising:

a liquid tank fluidly connected to the common chamber.

8. The liquid ejection head according to claim 5, wherein each nozzle is offset from the midpoint of the respective pressure chamber in the first direction by one-quarter or less of the total length of the respective pressure chamber in the first direction.

9. A liquid ejection device, comprising:

a liquid ejection head including:

a pressure chamber extending in a first direction from a first end to a second end as a flow path for a fluid, and a nozzle for ejecting liquid from the pressure chamber in a second direction intersecting the first direction, the nozzle being at a position offset from a midpoint of the pressure chamber in the first direction towards one of the first or second ends of the pressure chamber; and a conveyance device configured to convey a medium past the liquid ejection head, wherein the first end of the pressure chamber is open to a common chamber from which fluid can flow into the pressure chamber, and the second end of the pressure chamber is closed to fluid flow.

10. The liquid ejection device according to claim 9, wherein the nozzle is closer the first end than the second end.

11. The liquid ejection device according to claim 9, wherein the nozzle is offset from the midpoint of the pressure chamber in the first direction by one-quarter or less of the total length of the pressure chamber in the first direction.

12. A liquid ejection device, comprising:

a liquid ejection head including:

a pressure chamber extending in a first direction from a first end to a second end as a flow path for a fluid, and a nozzle for ejecting liquid from the pressure chamber in a second direction intersecting the first direction, the nozzle being at a position offset from a midpoint of the pressure chamber in the first direction towards one of the first or second ends of the pressure chamber; and a conveyance device configured to convey a medium past the liquid ejection head, wherein the first end is open to a first common chamber from which fluid can flow into the pressure chamber, and the second end is open to a second common chamber into which fluid can flow from the pressure chamber.

13. The liquid ejection device according to claim 12, wherein the nozzle is closer to the second end than the first end.

14. The liquid ejection device to claim 12, wherein the nozzle is at a position less than one-half the total length of the respect pressure chamber in the first direction from the second end.

15. The liquid ejection device according to claim 12, wherein the nozzle is offset from the midpoint of the pressure chamber in the first direction by one-quarter or less of the total length of the pressure chamber in the first direction.

* * * * *